(12) United States Patent
Ma et al.

(10) Patent No.: US 7,740,988 B2
(45) Date of Patent: Jun. 22, 2010

(54) FUEL CELL PLATE STRUCTURE HAVING BAFFLES IN WET SEAL AREA

(75) Inventors: Zhiwen Ma, Sandy Hook, CT (US); Chao-Yi Yuh, New Milford, CT (US); Dana A. Kelley, New Milford, CT (US); Mohammad Farooque, Danbury, CT (US); William Beesley, Orange, CT (US)

(73) Assignee: FuelCell Energy, Inc., Danbury, CT (US)

( * ) Notice: Subject to any disclaimer, the term of this patent is extended or adjusted under 35 U.S.C. 154(b) by 1118 days.

(21) Appl. No.: 11/396,151

(22) Filed: Mar. 31, 2006

(65) Prior Publication Data

US 2007/0231659 A1 Oct. 4, 2007

(51) Int. Cl.
H01M 2/08 (2006.01)
H01M 8/02 (2006.01)
H01M 4/88 (2006.01)
H01M 8/14 (2006.01)
B05D 5/12 (2006.01)

(52) U.S. Cl. .................. 429/469; 429/457; 429/472; 429/508; 429/514; 427/115

(58) Field of Classification Search .................. 429/38, 429/35, 34, 36, 469, 457; 427/115; 502/101
See application file for complete search history.

(56) References Cited

U.S. PATENT DOCUMENTS

| 4,514,475 | A | 4/1985 | Mientek ................. 429/35 |
| 4,579,788 | A | 4/1986 | Marianowski et al. ....... 429/16 |
| 4,963,442 | A * | 10/1990 | Marianowski et al. ....... 429/13 |
| 5,478,663 | A | 12/1995 | Cipollini et al. ........... 429/35 |
| 5,773,161 | A | 6/1998 | Farooque et al. ........... 429/34 |
| 6,017,649 | A | 1/2000 | Pondo .................... 429/35 |
| 6,372,374 | B1 | 4/2002 | Li et al. ................... 429/36 |
| 7,011,904 | B2 | 3/2006 | Bunker |
| 2004/0023093 | A1 * | 2/2004 | Bunker .................... 429/34 |
| 2004/0142223 | A1 | 7/2004 | Allen et al. |
| 2005/0042494 | A1 | 2/2005 | Yuh et al. |

* cited by examiner

*Primary Examiner*—Jonathan Crepeau
*Assistant Examiner*—Kenneth Douyette
(74) *Attorney, Agent, or Firm*—Cowan Liebowitz & Latman, P.C.

(57) ABSTRACT

An assembly having fuel cell plate structure adapted for use in a fuel cell in which gas flow channels are arranged to carry process gas adjacent the active and wet seal areas of the fuel cell, the plate structure having one or more baffles arranged such that when the plate structure is in the fuel cell the baffles of the plate structure cause the process gas flowing adjacent the wet seal areas to be directed away from the wet seal areas and toward the active areas of the cell.

42 Claims, 12 Drawing Sheets

FUEL CELL PLATE STRUCTURE HAVING BAFFLES IN WET SEAL AREA

BACKGROUND OF THE INVENTION

This invention relates to fuel cells and, in particular, to fuel cell plate structure used to establish fuel cell gas flow channels.

A fuel cell is a device which directly converts chemical energy stored in hydrocarbon fuel into electrical energy by means of an electrochemical reaction. Generally, a fuel cell comprises an anode and a cathode separated by an electrolyte, which serves to conduct electrically charged ions. Molten carbonate fuel cells operate by passing a reactant fuel gas through the anode, while oxidizing gas is passed through the cathode.

In order to produce a useful power level, a number of individual fuel cells are stacked in series to form a fuel cell stack. Fuel cells in a molten carbonate fuel cell stack employ plate structure in establishing gas flow channels through the cells. The plate structure typically includes an electrically conductive separator plate, also called a bipolar separator plate, between adjacent cells. Particularly, the bipolar separator plate is used to separate an anode element of a first cell and a cathode element of a second cell, and to provide electrical contact with the current collectors in these cells.

A conventional bipolar separator plate includes a flat, rectangular, gas-impermeable plate member having a cathode surface facing one adjacent cell and an anode surface facing another adjacent cell. The bipolar plate typically also includes two pocket areas on each surface. These pocket areas may be formed by folding two opposite edges of the plate over the cathode surface and by folding the other two edges over the anode surface. An example of plate structure having such bipolar plate arrangement is disclosed in U.S. Pat. No. 6,372,374, assigned to the same assignee herein.

Anode and cathode current collectors are also part of the plate structure and abut the anode and cathode surfaces, respectively, and extend into the pocket areas of the bipolar separator. An anode and a cathode, in turn, abut the anode and cathode current collectors which along with the bipolar separator define anode and cathode gas flow channels for delivering fuel and oxidant gases to the respective electrodes.

An electrolyte matrix is disposed adjacent to the anode electrode and extends over the outer surfaces of the two pocket areas at the anode surface of the bipolar separator plate, while an electrolyte matrix is also disposed adjacent to the cathode electrode and extends over the outer surfaces of the two other pocket areas at the cathode surface of the separator plate. The plate structure having the bipolar separator plate, current collectors with matrices thus forms one-half of a first fuel cell and one-half of a second cell.

Stacking of these half-cell units results in complete fuel cells arranged in a stack. With such a fuel cell stack, the outer surfaces of the pocket areas of the bipolar separator plates act as rails to form wet seal areas with the electrolyte matrices. The pocket areas also are the inactive areas of the cells. The central areas of the bipolar separator plates formed by the cathode and anode surfaces between the pocket areas, in turn, are the active areas of the cells.

Forming the wet seal areas using the bipolar plate pocket areas is a practical and cost effective way to achieve gas tightness around the peripheral areas of the cells. However, a common problem associated with this arrangement is leaking of the fuel and oxidant gases flowing in the gas flow channels established by the plate structure from the active cell areas into the wet seal areas. Particularly, a portion of the fuel gas and a portion of the oxidant gas typically bypass the active cell areas by flowing into and through the wet seal areas without undergoing the desired electrochemical reaction. Moreover, in internally reforming fuel cells, where additional cooling is provided in the anode active areas through internal fuel reforming, the fuel bypassing the anode active areas is not reformed and therefore less cooling is provided in the cell active areas. As a result, the fuel cells may become overheated, and the efficiency and power output of the fuel cell stack are reduced. Accordingly, a means of inhibiting or retarding gas from flowing into the wet seal areas is needed to improve the fuel cell stack performance and efficiency.

Additionally, the wet seal areas are particularly vulnerable to electrochemical corrosion and oxidation. Therefore, the materials used in the wet seal areas need to be stable under electrochemical corrosion and oxidation conditions.

It is therefore an object of the present invention to overcome the above and other drawbacks of conventional fuel cell plate structure by adapting the plate structure to inhibit or retard gas from bypassing the active cell areas.

It is also an object of the present invention to provide a fuel cell plate structure further adapted to direct gas from the wet seal areas into the active cell areas.

It is a further object of the present invention to provide a fuel cell plate structure adapted as above set forth and using material in the wet seal areas which is stable in corrosive and oxidative environments.

SUMMARY OF THE INVENTION

In accordance with the principles of the present invention, the above and other objectives are realized in an assembly having fuel cell plate structure adapted for use in a fuel cell in which gas flow channels are arranged to carry process gas adjacent the active and wet seal areas of the fuel cell, the plate structure having one or more baffles arranged such that when the plate structure is in the fuel cell the baffles of the plate structure cause the process gas flowing adjacent the wet seal areas to be directed away from the wet seal areas and toward the active areas of the cell.

Illustrative embodiments of the invention using a number of baffle designs and materials are described herein. In these embodiments, the plate structure includes a current collector plate having baffles arranged along opposite first and second edges of the plate. The current collector plate may be a cathode current collector plate or an anode current collector plate and the baffles may be arranged at different orientations with respect to the edges of the plate depending upon the type of plate.

Also, in the embodiments of the invention to be discussed below, the plate structure further includes a bipolar separator having opposing anode and cathode surfaces, first and second pocket areas at opposing edges of the anode surface forming wet seal areas and third and fourth pocket areas at opposing edges of the cathode surface also forming wet seal areas. In these embodiments, the plate structure has an anode current collector plate abutting the anode surface of the bipolar separator plate with baffles along its opposite first and second edges extending into the first and second pocket areas. The plate structure also includes a cathode current collector plate abutting the cathode surface of the bipolar separator plate with baffles along its opposite edges extending into the third and fourth pocket areas.

In certain embodiments of the invention, the baffles of the plate structure are each formed by a material situated on the plate structure. One type of material used is paste material and, in particular, a ceramic paste, e.g. Cotronics, Inc. Resbond 989 based paste. Other materials that have been used include a mixture of a binder and a Ni255 powder, a ceramic felt and a ceramic paper. Each material has different advantages ranging from easy installation to good performance. Also, the baffles in these embodiments can have various configurations, e.g. can be formed as a continuous rectangular-shaped strip of material or as a plurality of spaced strips of material or as a continuous saw-toothed shaped piece of material, and can be of different number and size.

In other embodiments of the invention, the baffles can be formed by flaps or upset segments of each plate. The latter is a mechanical baffle system and each baffle can be directly stamped from the plate which may be corrugated.

Methods of making the plate structure with baffles are also described.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
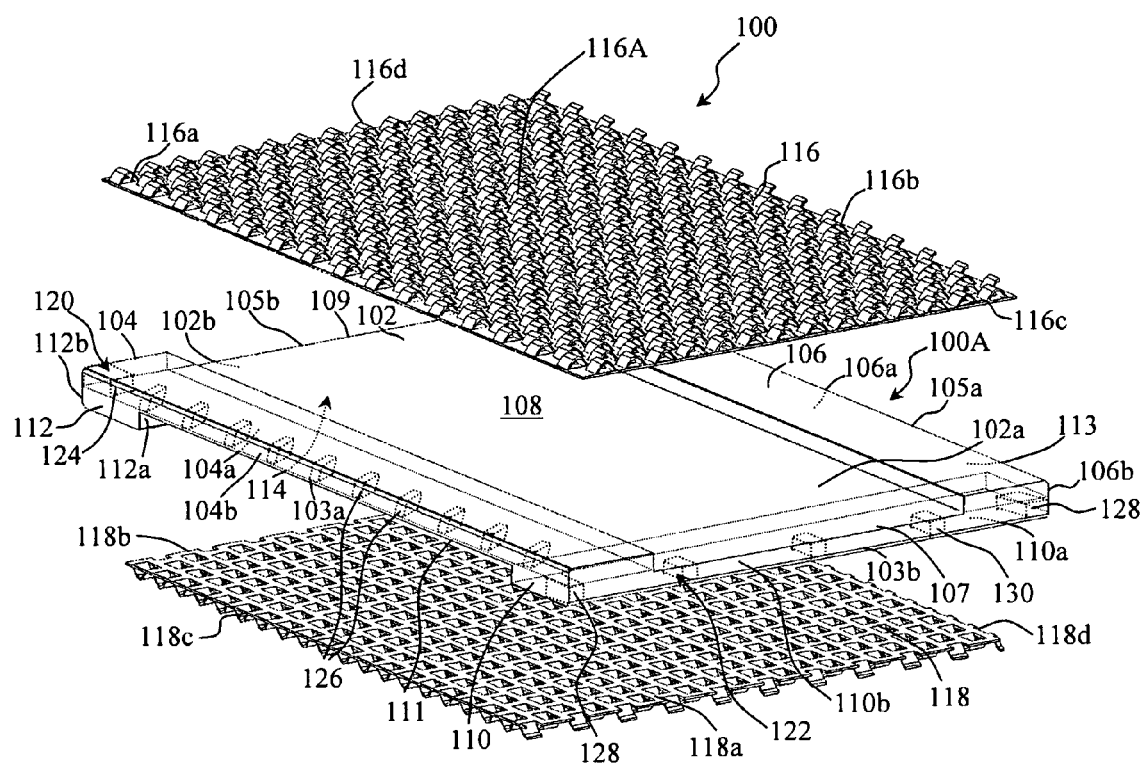
FIG. 1 shows fuel cell plate structure with baffles.

FIG. 1 shows plate structure 100 including a bipolar plate 100A. The bipolar plate 100A includes a flat, substantially rectangular, gas-impermeable plate member 102 having an anode surface 102a and a cathode surface 102b.

The anode surface 102a of the plate member 102 has two pocket areas or members 104 and 106 formed at opposed edges 103a and 105a, respectively, of the anode surface 102a and extending along the length of the plate 102 from a fuel inlet edge 107 to a fuel outlet edge 109. The pocket members 104 and 106 open into a central portion or area 108 of the anode surface 102a. As discussed below, when the plate structure 100 is incorporated into a fuel cell, the pocket members form inactive anode-side wet seal areas 104a and 106a, respectively, with the electrolyte matrix of the associated fuel cell. The area 108, in turn, acts the anode active area, or the anode reaction zone, with the anode of the fuel cell. It is in the anode active area where fuel process gas of the fuel cell undergoes an electrochemical reaction and may be internally reformed.

The cathode surface 102b of the plate member 102 also has two pocket members 110 and 112 formed at the other opposed edges 103b and 105b, respectively, of the cathode surface 102b. The pocket members 110, 112 extend along the width of the plate from a cathode inlet edge 111 to a cathode outlet edge 113. Similarly, the pocket members 110 and 112 open into a central area or portion 114 of the cathode surface 102b. As with the pocket members 104, 106, when the plate structure is incorporated into a fuel cell, the pocket members 110, 112 form inactive cathode side wet seal areas 110a and 112a, respectively with the electrolyte matrix of the associated cell. In this case, the area 114 acts as a cathode active area with the cathode of the cell. In this area, oxidant gases flowing through the cathode side of the cell undergo an electrochemical reaction.

The plate structure 100 also includes an anode current collector 116 and a cathode current collector 118, each having a substantially rectangular shape corresponding to the shape and the length and width dimensions of the plate member 102. As shown, each current collector is in the form of a corrugated plate. When assembled together with the bipolar plate 100A, side edges 116a and 116b of the anode current collector 116 are inserted into the pockets 104 and 106, respectively, while the inlet edge 116c and outlet edge 116d lie adjacent the fuel inlet edge 107 and fuel outlet edge 109 of the plate 102. The side edges 118a and 118b of the cathode current collector 118, in turn, are inserted into the pockets 110 and 112, respectively, while the inlet edge 118c and outlet edge 118d lie adjacent the oxidant inlet edge 111 and oxidant outlet edge 113 of the plate 102. Also, when assembled, an anode electrode (not shown) is disposed in the active area 108 of the plate assembly 100 adjacent to the anode current collector 116 and a cathode electrode (not shown) is disposed in the cathode active area 114 of the assembly 100 adjacent to the cathode current collector 118.

The bipolar separator 100A and the anode and cathode current collectors 116 and 118 establish gas flow passages for the fuel and oxidant gases. These gas flow passages pass adjacent the active anode and cathode areas 108 and 114 and the inactive anode and cathode wet seal areas 104a, 106a, 110a and 112a. Thus, the fuel gas flowing through the anode and through the corrugations of the anode current collector 116 from the anode inlet side 107 to the anode outlet side 109 passes adjacent the active anode areas and inactive anode wet seal areas. Likewise, the oxidant gas flowing through the cathode and the cathode current collector corrugations from the cathode inlet side 111 to the cathode outlet side 113 passes adjacent the active cathode areas and the inactive cathode wet seal areas.

To improve fuel cell performance, the assembly 100 is further adapted to retard or inhibit gas flow in the portions of the gas flow channels adjacent the inactive anode and cathode wet seal areas 104a, 106a, 110a and 112a and to enhance gas flow in the portions of the gas flow channels adjacent the anode and cathode active areas 108 and 114. To this end, the assembly 100 includes baffle assemblies 120 and 122 situated to lie in the portions of the gas flow paths adjacent to the anode and cathode wet seal areas. The baffle assemblies 120 and 122 redirect the passing gases toward the portions of the gas flow paths adjacent to the active anode and cathodes areas, thereby enhancing the gas flow in these portions of the gas flow passages.

Figure 1A:
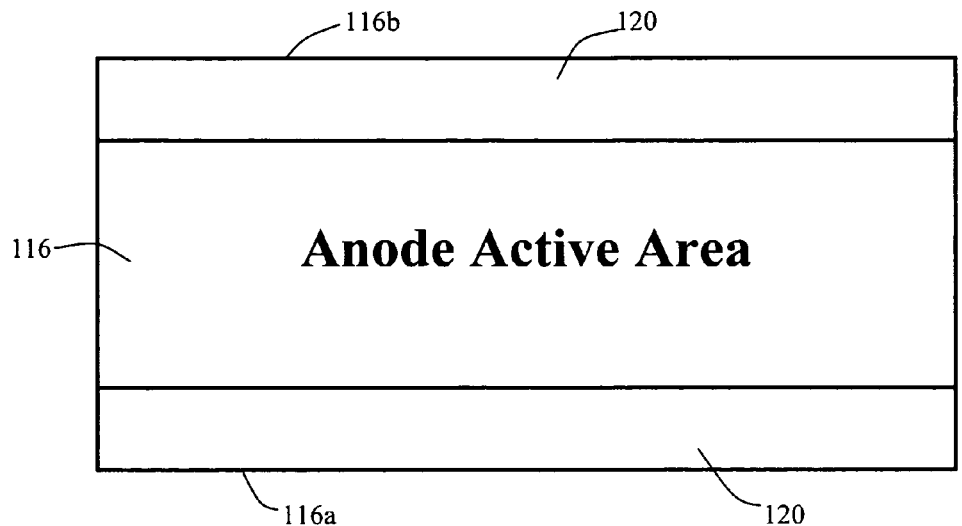
FIGS. 1A and 1B show schematic views of the anode current collector and cathode current collector, respectively, of the plate structure of FIG. 1.

One way of implementing the baffles assemblies 120 and 122 is to include a continuous strip of solid material in and along the length of each of the respective inactive wet seal area 104a, 106a, 110a and 112a. This can be accomplished by incorporating the baffles assemblies into the current collectors 116 and 118. FIG. 1A shows the baffles 120 formed as rectangular strips incorporated into or situated along the edges 116a, 116b of the anode current collector 116. As can be appreciated, when the current collector 116 is adjacent the anode surface 102a of the plate member 102, the baffle strips 120 will lie in the anode wet seal areas 104a and 106a. Similarly, FIG. 1B shows the baffle assemblies 122 also formed as rectangular strips incorporated into or situated along the edges 118a, 118b of the cathode current collector 118 so as to lie in the anode wet seal areas 110a and 112a when the current collector 118 is adjacent the cathode surface 102b of the plate member 102.

Figure 1B:
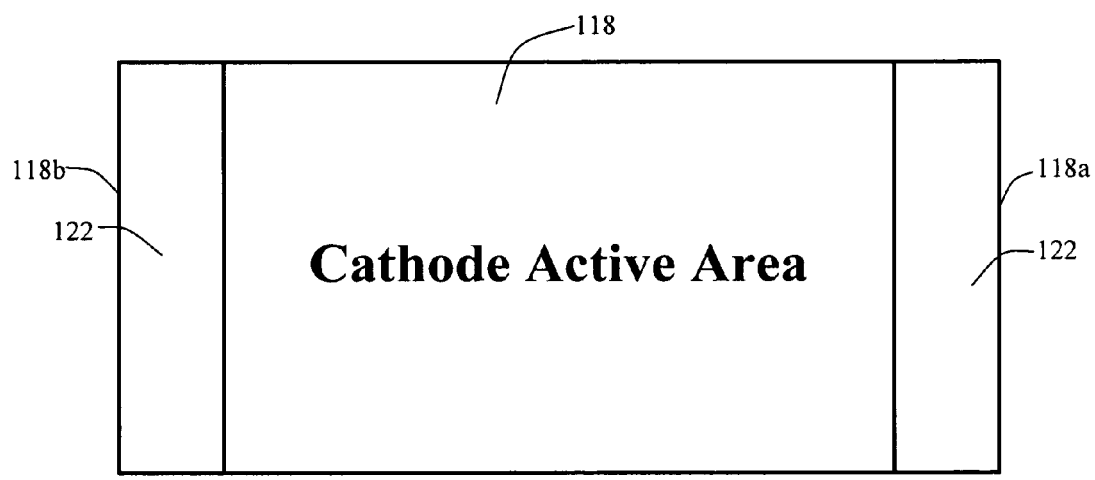

To tolerate the harsh corrosive environment of the fuel cell electrochemical reaction, the material used for the baffle strips 120 and 122 in FIGS. 1A and 1B should be stable and easy to apply to the current collectors. A paste made from Ni powder and binder can be used to fabricate each of the baffle strips and can be formed as a single-one piece strip or a number of strips abutting one another. In the anode wet seal areas 104a and 106a, the Ni powder of the baffles 120 can act as a catalyst for methane reforming in an internally reforming fuel cell stack, so as to prevent the methane slippage when migrating through Ni powder formed pores. The nickel paste can be formed from slurry prepared from a mixture of a binder and a Ni255 powder.

At the beginning of fuel cell stack life, the baffle strips of FIGS. 1A and 1B in the wet seal areas effectively block bypass flow therethrough. However, the baffles can increase the stiffness of the inactive well seal areas as compared to the cell active areas. This, in turn, can cause stack thermal and electrical contact losses. Another concern with this type of baffle is that the filling material may disintegrate during operation and thermal cycle, and pulverize to form loose porous structure. The loose porous structure can allow leak of useful reactant gas through the respective wet seal area. Also, these baffles require a significant amount of Ni powder which adds additional product cost.

Other baffle configurations illustrative of the invention attempt to avoid the stiffening of the wet seal areas caused by the baffles of FIGS. 1A and 1B and to reduce the baffle material usage. More particularly, a discrete baffle arrangement is shown in FIG. 1 and described in more detail below. Specifically, in FIG. 1 each baffle assembly 120 includes a plurality of discrete spaced fuel directing baffles or strips 126 and at least one discrete end baffle or strip 124. In the illustrative example shown, the discrete end baffles 124 form barriers in the fuel gas flow path at the corner regions of the wet seal areas 104a and 106a near the fuel outlet edge 109 of the plate member 102. Fuel gas flowing in the fuel gas flow path established by the wet seal area 104a, 106a is therefore guided by the end baffle 124 into the anode active area 108 and to the fuel outlet. The discrete directing baffles 126 extend from sidewalls 104b, 106b of the pockets 104, 106 into the wet seal areas 104a, 106a at predetermined intervals. As shown, the directing baffles 126 are inclined in the direction of the fuel flow so as to increase flow resistance to the fuel gas flowing in the portions of the fuel gas flow path adjacent to the wet seal areas 104a, 106b and to push the fuel gas into the portions of the fuel gas flow paths adjacent the fuel gas active area 108 of the cell.

As also described in more detail below, the oxidant gas directing assembly 122 shown in FIG. 1 also includes a plurality of discrete baffles or strips enclosed by the cathode-side pockets 110 and 112. In the case shown, the directing assembly 122 includes discrete end baffles 128 positioned at the wet seal area corners near the oxidant outlet edge 113 and near the oxidant inlet edge 111 of the plate member 102. Discrete oxidant directing baffles 130 which extend from sidewalls 110b, 112b formed by the pockets 110, 112 into the wet seal areas 110a, 112a at predetermined intervals, are also provided. In this illustrative example, the baffles 128, 130 are substantially perpendicular to the pocket sidewalls 110b, 112b. As can be appreciated, the end baffles and directing baffles 128, cause oxidant gas flowing in the portions of the oxidant gas flow paths adjacent the cathode wet seal areas 110a and 112a to be pushed or redirected into the portions of the oxidant gas flow path adjacent the oxidant gas active area 114.

The dimensions and arrangement of the discrete baffles in the directing assemblies 120, 122 of FIG. 1 will vary depending on various factors including the configurations of the fuel cell system and the bipolar plate, and the space velocities of the fuel and oxidant gases flowing through the cells. Illustrative configurations of the directing assemblies 120, 122 are described herein in detail with reference to FIGS. 2A-4B.

Figure 2A:
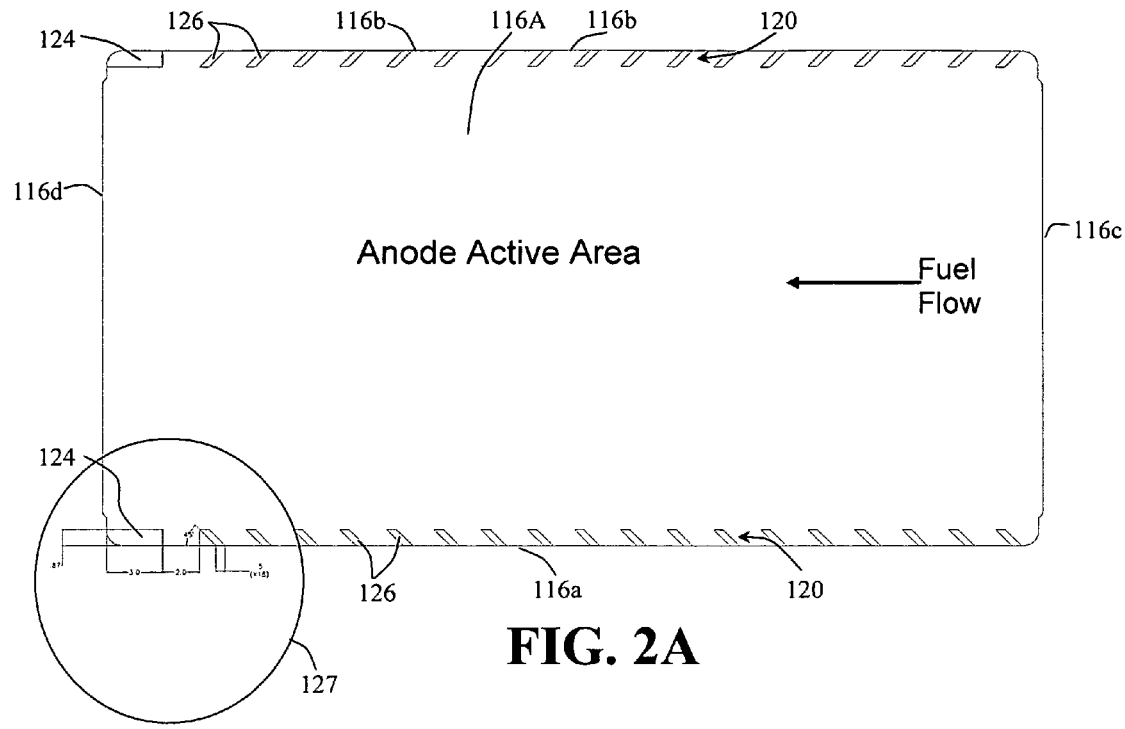
FIG. 2A shows a schematic view of a further form of the anode current collector of the plate structure of FIG. 1.

In FIGS. 2A-4B, as in FIGS. 1A and 1B, the baffle assemblies 120 and 122 are incorporated into the anode current collector 116 and cathode current collector 118, respectively, of the plate structure 100. More particularly, FIG. 2A shows a schematic view of the anode current collector 116 with the fuel directing assemblies 120 arranged at its opposite edges 116a and 116b. The central area 116A of the current collector aligns with the anode active area 108, while the edges 116a and 116b align with the anode wet seal areas 104a, 106a. Fuel gas flows through the central area 116A (the anode active area 108) in the direction from the inlet edge 116c (fuel inlet edge 107) to the outlet edge 116d (fuel outlet edge 109), as discussed above. As also discussed above, some of the fuel gas leaks from the central area 116A (active area 108) into the edge areas 116a, 116b (wet seal areas 104a, 106a). The baffle assemblies 120 along the side edges then act to redirect this fuel back to the central area 116A (active area 108). It should be noted that the arrangement of the directing assemblies 120 shown in FIG. 2A can be used in a fuel cell system employing a plate member 102 having various length and width dimensions. An illustrative example is a plate having a length of about 4 feet and a width of about 2 feet. However, as previously stated, the directing assemblies 120 have application to plate members 102 of any length and width dimension.

In FIG. 2A, each baffle assembly 120 includes eighteen directing baffles 126 which are equidistant from one another. It is understood, however, that the number of baffles 126 may be varied and the baffles 126 may be positioned at different intervals so as to direct more fuel gas from the side edges 116a, 116b (wet seal area 104a, 106a) into predetermined regions of the central area 116A (active area 108). Additionally, as discussed above, and as shown in detail here, the directing baffles 126 are inclined in the direction of the fuel flow at a predetermined angle. In the case shown, the predetermined angle is 45 degrees with respect to the side edges 116a, 116b. Again, the incline of the directing baffles 126 may vary depending on the arrangement of the directing assembly 120 as well as the manufacturing convenience.

Figure 2B:
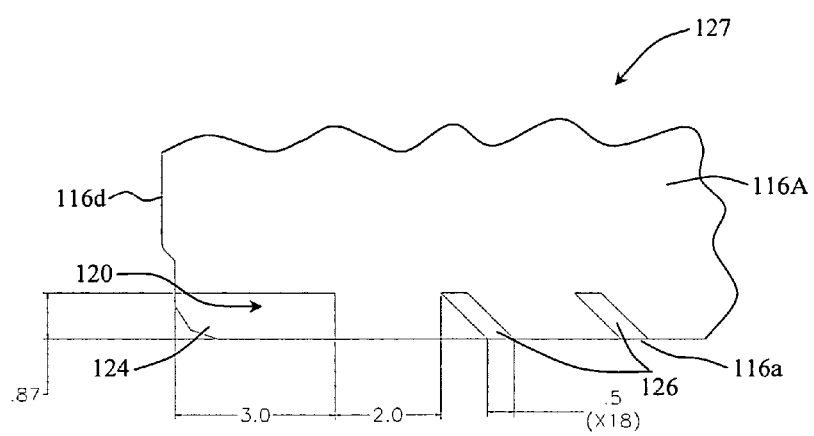
FIG. 2B is an exploded view of an end portion of the anode current collector of the plate structure of FIG. 2A.

FIG. 2B shows an exploded view of a corner portion 127 of the anode current collector 116 of FIG. 2A. As shown, the end baffle 124 of each directing assembly 120 forms a substantially rectangular barrier near the outlet edge 116d (fuel outlet side 109 of the wet seal area 104a, 106a). In particular, each end baffle 124 extends from the outlet edge 116d along the respective side edge 116a, 116b and is of a thickness to restrict gas flow. As mentioned above, the directing baffles 126 are inclined toward the outlet edge 116d (fuel outlet side 109) and form a 45 degree angle with the respective side edge 116c or 116d.

In one particular configuration of the baffle assemblies of FIGS. 2A and 2B, the following were used: each end baffle 124 had a length of 3.0 inches and a width of 0.87 inches; each directing baffle 126 extended 0.88 inches from the side edge 103a and had a width of 0.5 inches and a length of 1.23 inches; the directing baffles 126 were equally spaced at a distance of 2.87 inches; and the space between the end baffle 124 and the nearest directing baffle 126 was also 2.87 inches.

Figure 2C:
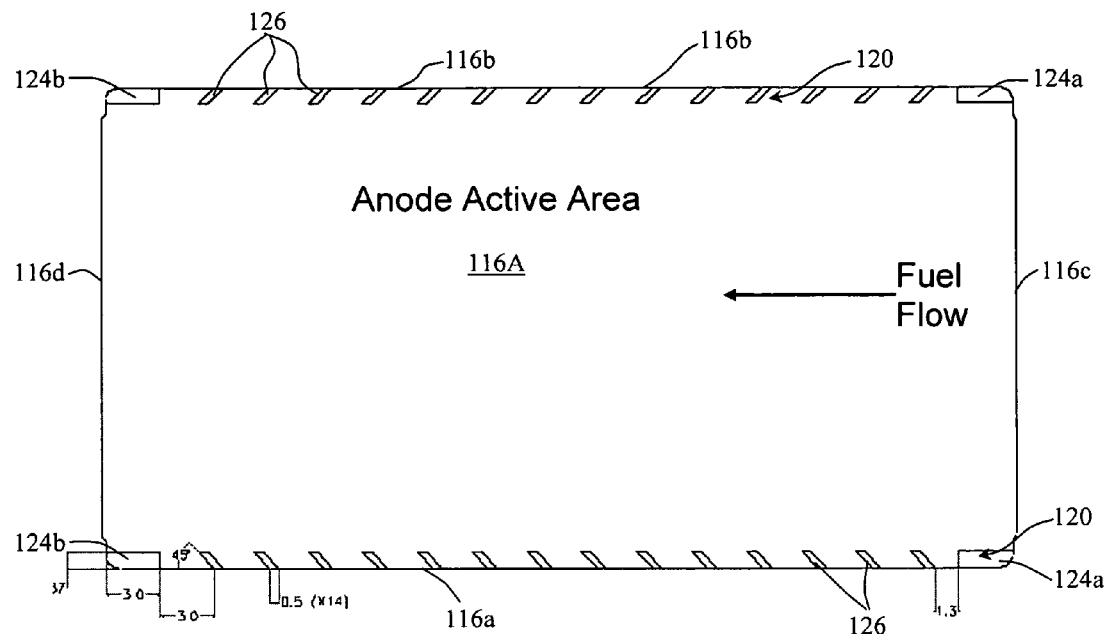
FIG. 2C shows a schematic view of a modification of the anode current collector of the plate structure of FIG. 2A.

FIG. 2C shows a modification of the baffle assemblies 120 of FIG. 2A on the anode current collector 116. The arrangement of FIG. 2C differs from the arrangement of FIG. 2A in that end baffles 124a are also located at the inlet edge 116c of the anode current collector 116. As illustrative configuration of the baffle assembly 120 of FIG. 2C was as follows: the width, length and inclination of the directing baffles 126 was the same as those for the illustrative example of the baffles 126 in the FIG. 2A case; the baffles were 14 in number and equidistant with a distance between baffles of 3 inches; the distance between the inlet baffle 124a and the nearest directing baffle 126 was 1.3 inches; and the distance between the outlet baffle 124b and the nearest directing baffle 126 was 3 inches.

Figure 3:
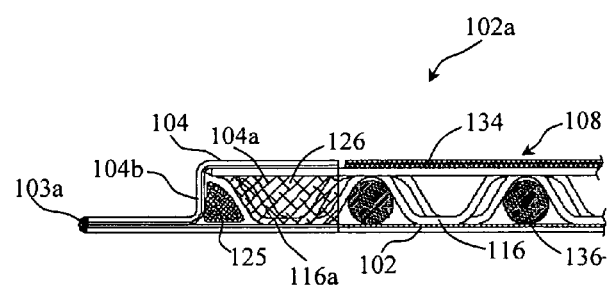
FIG. 3 shows a cross-sectional view of a portion of the anode side of the plate structure of FIG. 1.

FIG. 3 shows a cross-sectional view of a portion of the anode side of the plate structure 100 of FIG. 1. As can be seen, the side edge 116a of the anode current collector 116 is in the pocket 104 forming the wet seal area 104a and the corrugations of the current collector at this position are filled by the baffle 126. This view also shows the anode electrode 134 lying on the current collector 116 inward of the pocket 104 and reforming catalyst 136 in selected corrugations. Additionally, a seal 125 is formed in the wet seal area along the edge of the anode current collector 116 filling the end corrugation to prevent fuel leaks and to further help seal off the edge 103a of the plate member 102. The additional seal 125 can be made from rope or ceramic paper.

The baffles 124, 126 of the directing assemblies 120 shown in FIGS. 2A-3 are prepared using paste formed from zirconium based materials. A method for preparing the paste and of manufacturing the baffles using this paste will be described in more detail below.

Figure 4A:
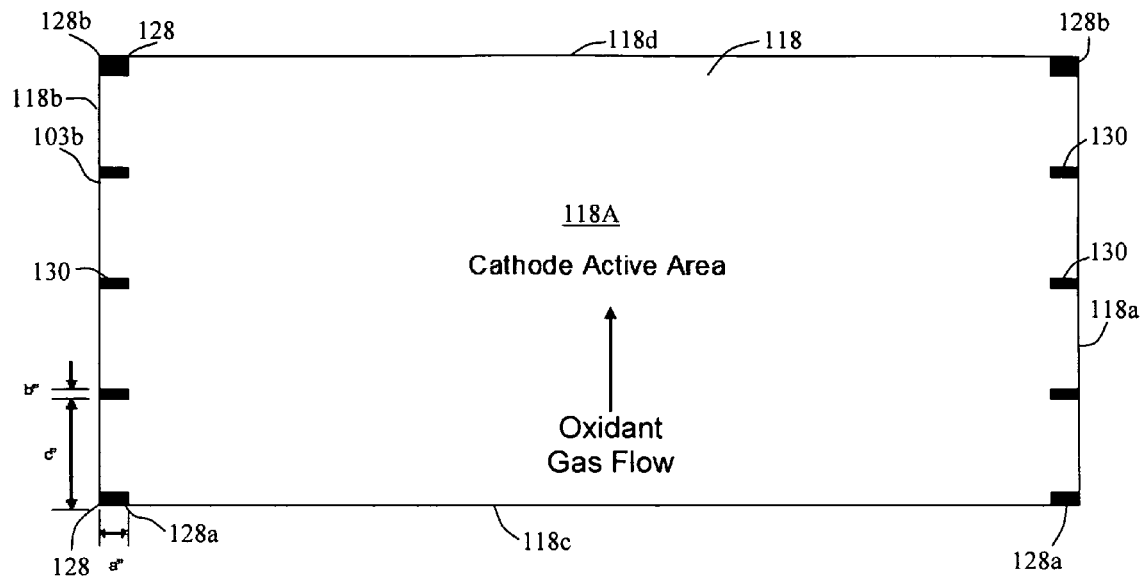
FIG. 4A shows a schematic view of a further form of the cathode current collector of the plate structure of FIG. 1.

FIG. 4A shows a schematic view of the cathode current collector 118 of FIG. 1 with the oxidant gas directing assemblies 122. The central area 118A of the current collector aligns with the cathode active area 114, while the edges 118a and 118b align with the wet seal areas 110a, 112a. Oxidant gas flows through the central area 118A (the anode active area 114) in the direction from the inlet edge 118c (oxidant inlet edge 111) to the outlet edge 118d (oxidant fuel outlet edge 113), as discussed above. As also discussed above, some of the oxidant gas leaks from the central area 118A (active area 114) into the edge areas 118a, 118b (wet seal areas 110a, 112a). The baffle assemblies 122 along the side edges then act to redirect this oxidant back to the central area 118A (active area 114).

Each directing assembly 122 includes end baffles and a plurality of directing baffles 130. The end baffles include inlet end baffles 128a provided at the corners of the inlet edge 118c and the side edges 118a, 118b an outlet end baffles 128b provided at the corners of the outlet edge 118d and the side edges 118a, 118b. Each baffle assembly 122 also includes three directing baffles 130 for directing the oxidant gas away from the edges 118a and 118b (the wet seal areas 110a, 112a) and for pushing the gas into the central area 118A (cathode active area 114). The directing baffles 130 extend from the respective edges 118a and 118b and are shown as being perpendicular to these edges.

As illustrative configuration of the baffle assembly 122 of FIG. 4A was as follows: the inlet end baffles 128a each had a width of inactive area and a length of approximately 2-4 inches; the width of each directing baffle 130 was 0.5 inches and the length of each directing baffle was 0.88 inches; the baffles 130 were arranged at equal intervals of 6.25 inches; the distance between the inlet edge baffle 128a and the nearest directing baffle 130 and the distance between the outlet edge baffle 128b and the nearest directing baffle 130 was 6.25 inches. As can be appreciated, the number of baffles 128, 130 and the intervals at which the directing baffles 130 are disposed may vary depending on the configurations of the fuel cell and the bipolar plate, the flow rate of the oxidant gas and the leak rate of the oxidant gas from the edge area (wet seal area) into the central area (active area).

Figure 4B:
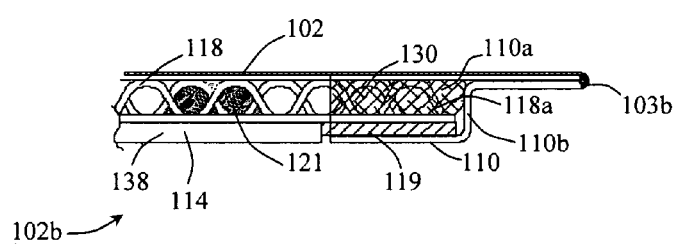
FIG. 4B shows a cross-sectional view of a portion of the cathode side of the plate structure of FIG. 1.

FIG. 4B shows a cross-sectional view of a portion of the cathode side of the assembly 100. As shown, the cathode current collector 118 is adjacent to the plate member 102 with a side edge 118a of the current collector 118 inserted into the pocket 110. Electrolyte paste 121 is disposed in selected current collector channels formed by the corrugations of the current collector. In addition, a shim 119 is provided in the wet seal area 110a to seal a space formed between the cathode current collector 118 and the pocket 110. Cathode electrode 138 is adjacent to the cathode current collector 118 and aligned with a cathode active area 114.

Gas directing baffle 130 on current collector 118 fills a predetermined portion of the wet seal area 110a to form a barrier in the pathway of oxidant gas flowing through the wet seal area 110a. The height of the baffle 130 is the same as the height of the current collector 118 and the length of the baffle 130 does not extend beyond the wet seal area 110a. In this way, oxidant gas flowing through the wet seal area 110a is blocked by the baffle 130 and, as a result, the gas is pushed or redirected out of the wet seal area 110a and into the cathode active area 114 where it can be used in fuel cell reactions.

The baffles 128, 130 shown in FIGS. 4A-B are prepared from a slurry formed from a further ceramic cement based on a mixture of a binder and a nickel powder. A method of manufacturing the slurry and the baffles from the slurry is described herein below.

Methods of preparing materials for the anode side baffles 124, 126 and for the cathode side baffles 128, 130 and methods of incorporating the baffles into the current collectors 116 and 118 will now be described. These methods were used to fabricate assemblies configured with dimensions as mentioned and their description refers to such dimensions.

As mentioned above, the anode side baffles 124, 126 are formed from zirconium based ceramic cement. In particular, the anode baffle paste is prepared by mixing predetermined amounts of alumina cement, zirconium oxide, ground zirconia felt and water. In the illustrative example here, Cotronics Inc.'s Resbond™ 989 alumina cement, zirconium oxide powder having particle size equal to approximately −140+325 mesh, ZYF-100 ground zirconia oxide powder (Zircar Zirconia, Inc.) and distilled water are used in preparing the baffle paste. Preferably, the anode baffle paste is prepared in batches, such as 20 cc size batches.

In a first step of preparing a batch of anode baffle paste, ZYF-100 gasket material is ground and mixed with Cotronics Resbond 989 alumina cement, high purity zirconium oxide powder and distilled water. In the present illustrative example, the anode baffle paste mixture includes the following relative amounts of each component: 2x grams of ZYF-100 gasket material, 167x grams of alumina cement, 25x grams of zirconium oxide powder and x grams of distilled water, where x can be varied depending on the size of the batch. For example, a 20 cc batch of anode baffle paste can be prepared using the above-described proportions by grinding 0.6 grams of ZYF-100 gasket material manufactured by Zircar Zirconia, Inc. using a mortar and pestle and mixing the ground ZYF-100 with 50.1 grams of Cotronics Resbond 989 alumina cement manufactured by Cotronics Corporation, 7.5 grams of high purity zirconium (IV) oxide powder manufactured by Alfa Aesar and 0.3 grams of distilled water in a plastic or other suitable container to form a paste.

In a second step, which immediately follows the first step, the paste is loaded into a syringe having a suitable size. The syringe is capped when the paste is not being applied to form anode side baffles. The paste may be stored in the syringe for up to two days.

The anode baffle paste prepared using the above-described method is then applied to the edges of the corrugated anode current collector. In a first step, a shim wrapped with FEP film is placed along a side edge of the anode current collector. The shim provides a casting edge and a guide for baffle paste being applied to the current collector.

In particular, for preparing the outlet end baffles 124, 124*b* shown in FIGS. 2A-2C, masking tape is first applied to the anode current collector at approximately 0.88 inches from the side edge and at approximately 3.0 inches from the outlet edge of the current collector. Similarly, when manufacturing the inlet end baffles 124*a* shown in FIG. 2C, masking tape is applied to the anode current collector at 0.88 inches from the side edge and at about 3.0 inches from the inlet edge of the current collector. In this way, the masking tape defines the boundaries of the end baffles, and provides a guide for filling the area within the boundaries with baffle paste.

In the next step, previously prepared anode baffle paste is dispensed from the syringe to fill the area of the anode current collector defined by the masking tape. The dispensed paste is then smoothed to a height of the corrugations of the current collector by drawing a squeegee or a roller across the anode current collector at an angle. In this example, a silicone squeegee is used to smooth the paste on the current collector by drawing the squeegee from the outlet or the inlet side end of the baffle to the opposing end of the baffle at an angle. After smoothing the paste, the shim can be removed from the anode current collector edge by sliding the shim laterally so as to release the baffle paste from the shim and then by pulling the shim away from the anode current collector edge. The shim can be wiped clean and reused in further baffle preparations.

Like the end baffles 124, the directing baffles 126 are also formed on the respective edges of the current collector. To prepare the directing baffles 126 on the anode current collector 116, a shim wrapped with FEP film is positioned along the side edge of the anode current collector. As mentioned above, the shim acts as a casting edge and a guide for the baffle paste being applied to the anode current collector. Masking tape is also applied along the length of the portion of the anode current collector to be disposed in the wet seal area approximately 0.875 inches from the side edge of the current collector. In this way, the masking tape defines the length boundary of the directing baffles 126.

In the next step, fuel directing baffles are formed at predetermined intervals in the region of the current collector defined by the shim and the masking tape. In particular, each directing baffle is prepared by dispensing an appropriate amount of the anode baffle paste from the syringe onto the anode current collector in a predetermined pattern and at a predetermined angle.

Figure 5A:
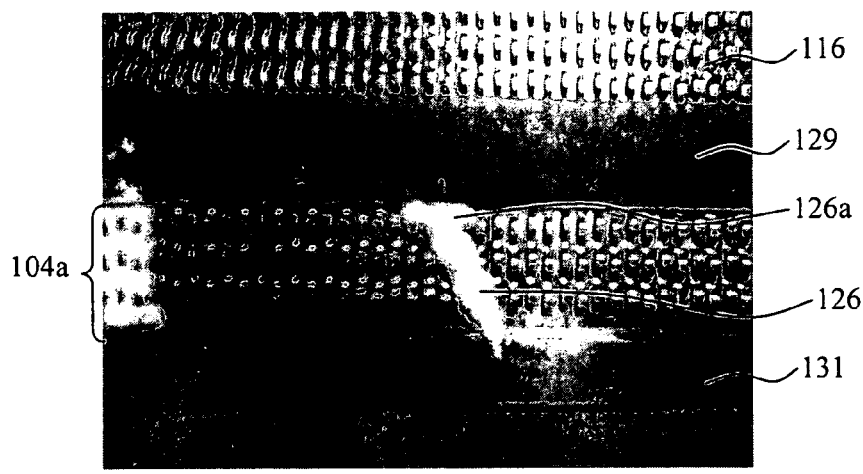
FIG. 5A shows a photograph of baffle paste along a side edge of the anode current collector of plate structure of the type shown in FIG. 1.

FIG. 5A shows a photograph of the anode baffle paste applied to the anode current collector to form a directing baffle 126. As shown, the directing baffle is formed by dispensing the paste in a T-shaped pattern such that the top portion of the "T" 126*a* is adjacent to the masking tape 129. In the present case, the paste is dispensed at an angle (i.e. 45 degree used here) with the shim 131 such that the resulting baffle 126 is inclined at 45 degrees in the direction of the fuel gas flow.

The baffle paste is smoothed to the height of the corrugations of the anode current collector using a squeegee or a roller. In this case, a silicone squeegee was used to draw across the anode current collector at a 45 degree angle from one end of the baffle to the other. The width of the finished directing baffle is about 0.5 inches.

As discussed above, the directing baffles are spaced at predetermined intervals along the length of the edges of the current collector. To form the directing assembly 120 shown in FIGS. 2A-2C, the directing baffles are spaced at approximately 3 inch intervals. Because the directing baffles are inclined, the spacing between the adjacent end portions of baffles is approximately 2 inches. As can be appreciated, the spacing between the baffles may vary depending on various factors such as the fuel flow and the amount of fuel leaking into the wet seal areas.

After the baffles are formed using the above method, the shim is removed by sliding it laterally to release the paste from the shim and by pulling the shim away from the anode current collector edge. The shim can then be wiped and reused. Masking tape is also removed from the current collector.

Figure 5B:
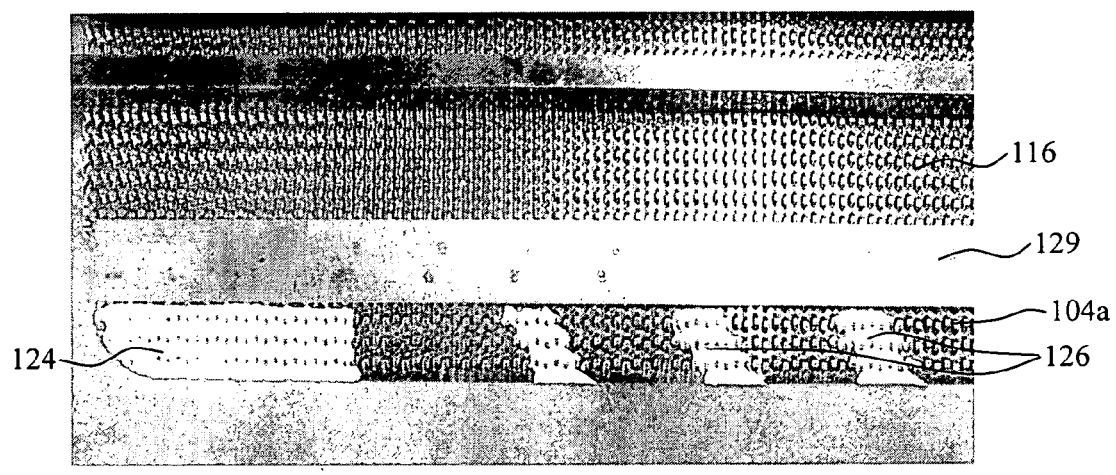
FIG. 5B shows a photograph of baffle paste at the end and along the side edge of the anode current collector of plate structure of the type shown in FIG. 1.

After the end baffles and the directing baffles are formed on the anode current collector, they are allowed to dry at room temperature for approximately 4 hours. Any excess paste on the corrugations and on the underside of the anode current collector is removed using a razor blade and a damp cloth. The finished end baffle 124 and three directing baffles 126 prepared using the above method are shown in a photograph in FIG. 5B.

A method of preparing a slurry for manufacturing the oxidant gas baffle assembly 122 and a method of preparing the baffles of the directing assembly from the slurry will now be described. As mentioned above and similar to continuous baffle material of the baffle assemblies of FIGS. 1A and 1B, the slurry is a mixture comprising a binder and a metallic powder. In particular, the oxidant baffle slurry is prepared from a predetermined amount of binder and nickel powder. In the illustrative example here, the slurry includes binder and Ni255 powder. The binder is made from a PVA (Polyvinyl Alcohol) Binder.

End baffles 128 of the baffle assembly 122 are prepared by applying the baffle slurry to the cathode current collector using a similar method as described above with respect to the fuel gas end baffles 124, 125 of the fuel directing assembly 120. Particularly, after positioning the shim wrapped with FEP film along the side edge of the cathode current collector, masking tape is applied to define the boundaries of the end baffles 128. In particular, masking tape is placed on the cathode current collector approximately 0.88 inches from its side edge and approximately 0.88 inches from the cathode outlet edge. The baffle slurry is then applied to the end baffle area on the cathode current collector defined by the shim and the masking tape. After applying the slurry, the shim can be removed, cleaned and reused.

Oxidant gas directing baffles 130 are also manufactured using a similar method as described above with respect to the fuel directing baffles 126. In this case, the shim wrapped with FEP film is positioned along the respective side edge of the cathode current collector. Masking tape is placed on the cathode current collector along the length of the cathode side wet seal area, approximately 0.88 inches from the side edge of the current collector. Masking tape defines the length boundary of the oxidant directing baffles 130.

In the next step, an appropriate amount of baffle slurry is dispensed in a predetermined pattern at predetermined locations on the cathode current collector within the area defined by the shim and the masking tape. In the illustrative example here, each directing baffle is formed by dispensing the slurry in a T-shaped pattern with the top portion of the "T" being adjacent to the boundary defined by the masking tape. The slurry is dispensed so as to form baffles perpendicular to the side edge of the cathode current collector. For each directing baffle, the slurry is smoothed to the height of the corrugations of the cathode current collector using a squeegee or a roller. The resulting directing baffles have a width of approximately 0.88 inches and a length of about 0.88 inches as defined by the masking tape.

As described above, the directing baffles are formed on the current collector at predetermined intervals. In the present case, the plurality of directing baffles are formed by dispensing the slurry at 2-3 inch intervals so that the resulting spaces between the baffles are approximately 2-3 inches.

In addition to the above-described Ni paste and zirconium based ceramic cement, other high temperature, corrosive resistant materials can be used for fabrication of the baffles of the baffle assemblies 120 and 122. Other examples are ZYF type Zirconia Felt (Zircar Zirconia, Inc.) and ceramic paper, etc. These solid materials have to be cut into the appropriate shape and inserted into or adhered to the current collector edges. Zirconia Felt has been tested in the fuel cell environment as gasket material and has shown excellent performance. ZYF Type Zirconia Felt series are composed of 4-6 micron diameter, yttria-stabilized zirconia fiber which are mechanically interlocked. These felts are inorganic fibers and contain no binders so as to be able to withstand extremely high temperature corrosive environments. These materials are also equally corrosive resistant in strong oxidization and reducing environments.

A roll or a sheet of Zirconia Felt can be cut into any shape for better performance as well as material saving. The solid soft strip of material can be designed in different shapes for easy assembly and reduced material usage.

Figure 6:
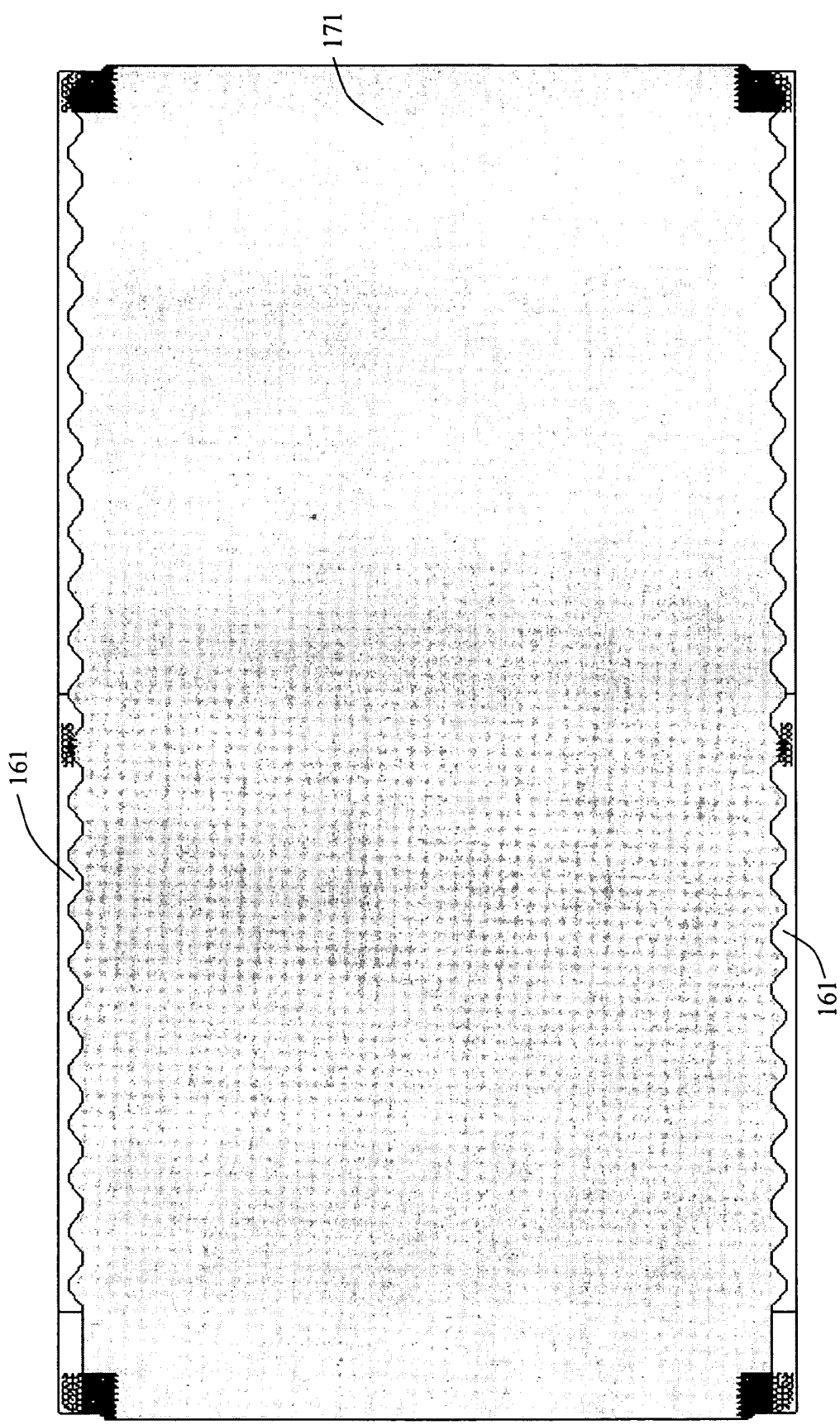
FIGS. 6, 7A and 7B show a saw-tooth shaped baffle and the manner of fabricating the baffle to save baffle material.
Figure 7A:
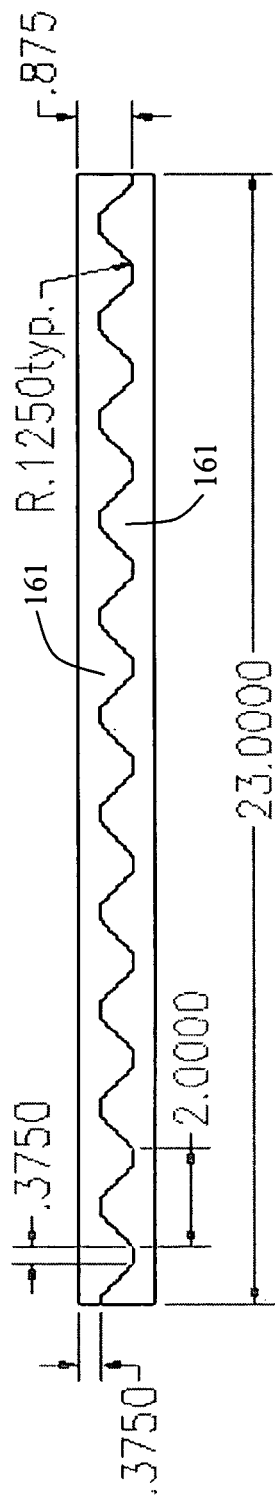
Figure 7B:
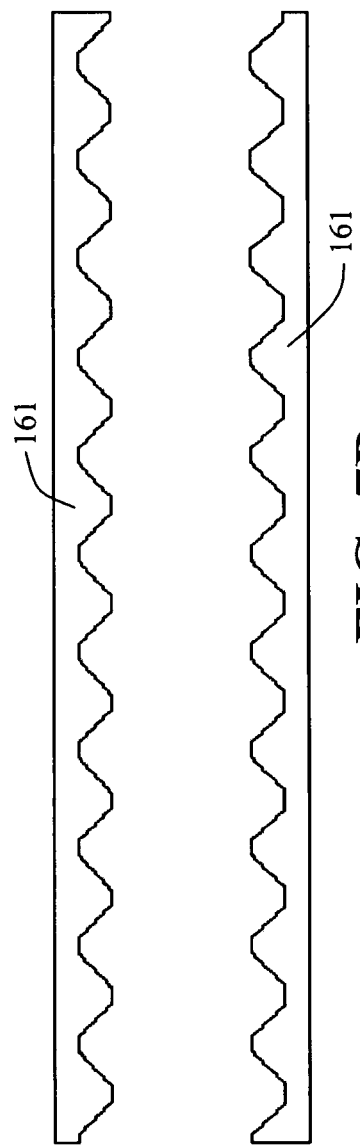

While felt materials can be used to form the discrete baffle assemblies of FIGS. 2-5, the formation of the discrete baffle pieces requires a considerable amount of time for preparation and placement. An alternate baffle assembly arrangement for the baffle assemblies 120 and 122 which lends itself to the use of felt materials is the saw-tooth-type assembly shown in FIGS. 6 and 7A-7B. The saw-tooth baffles 161 on the current collector plate 171 shown in FIG. 6 can be fabricated by centrally cutting a strip of felt material with the desired zig-zag pattern as shown in FIG. 7A. The resultant pieces 161 are then separated as shown in FIG. 7B to provide the individual baffles which are then situated along and adhered to the opposing edges of the current collector 171 as shown in FIG. 6. After applying the saw-tooth shaped baffles to the current collector edges, a ceramic regidizer, e.g., Zirconia Rigidizer (Zircar Zirconia, Inc.), can be used to harden and reinforce the porous zirconia felt structure.

The saw-tooth baffle configuration of FIGS. 6, 7A-B provides considerable savings in material. Also, the open area between adjacent teeth is an ideal place for loading the catalyst for reforming methane continuously in the wet seal area.

The saw-tooth shaped baffle is easier to place since fewer pieces of material need to be aligned along the edges of anode current collector plate. Also, with the saw-tooth shape, the gap between the baffle teeth is shallow so that less gas enters the wet seal area. The continuous configuration of the saw-tooth assembly also prevents the gas leaks to the outer edge of the current collector plate. This tends to minimize the reactant gas slipping through the edge seal clearance.

As can be appreciated, the cost of manufacturing the baffle assemblies is directly proportional, inter alia, to the amount of material, i.e., paste, slurry, felt, etc., required for sealing the wet seal area. A particular assembly can thus be selected which limits the amount of material required so as to satisfy cost constraints, while at the same time realizing the desired effect of preventing the fuel and oxidant gases from bypassing the active areas of the plate assembly. Moreover, the baffle assembly can be selected so as to limit the effects on the stiffness of the wet seal areas of the bipolar plate assembly. As a result, the mechanical behavior of the fuel cell stack, and particularly of the wet seal areas, is preserved such that the contact loss between the components of the cell active area is prevented during thermal cycles of the fuel cell.

Figure 8:
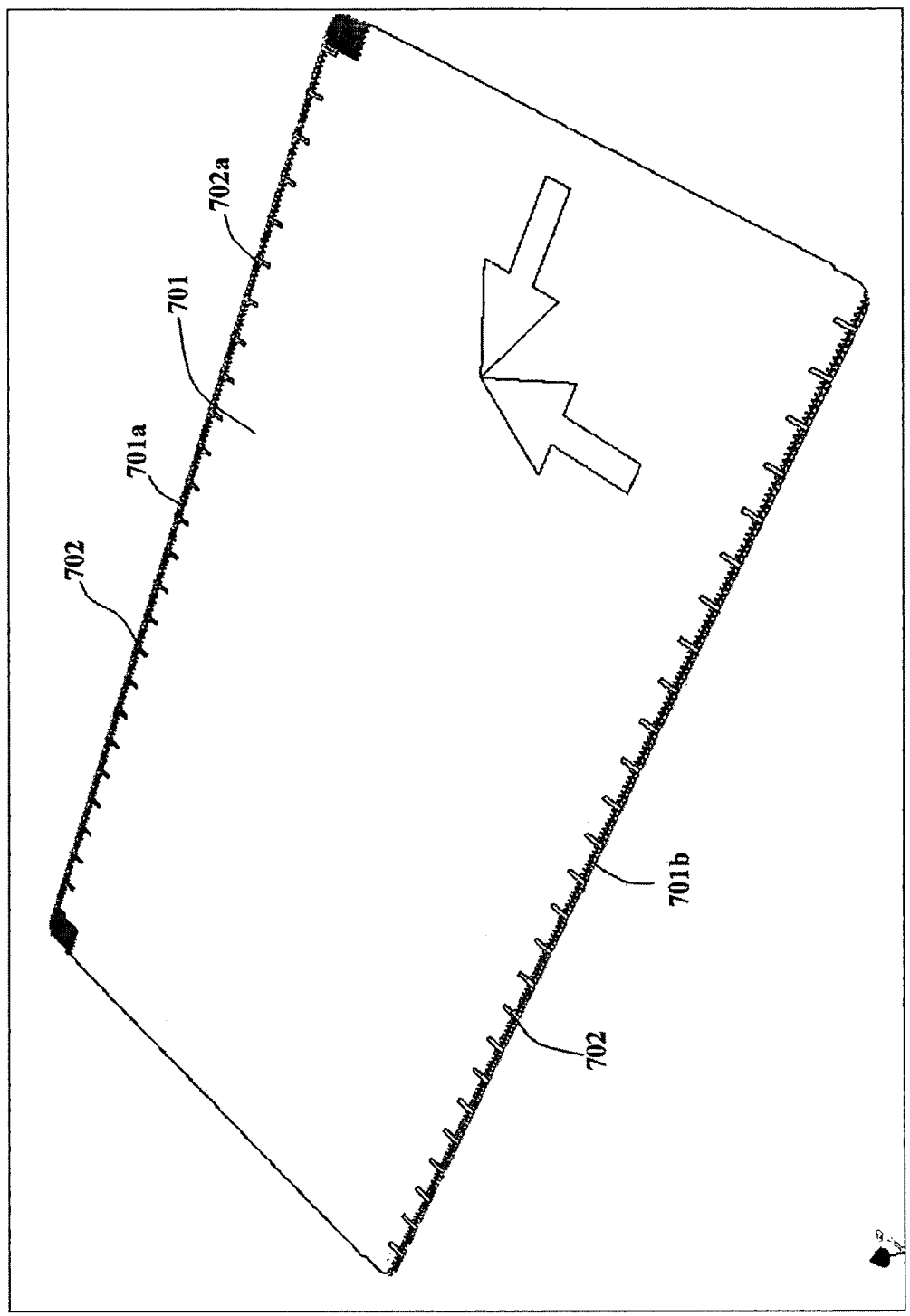
FIGS. 8-10 show a further embodiment of a current collector of plate structure in which the baffles are formed by flaps or upset portions of the current collector plate.
Figure 9:
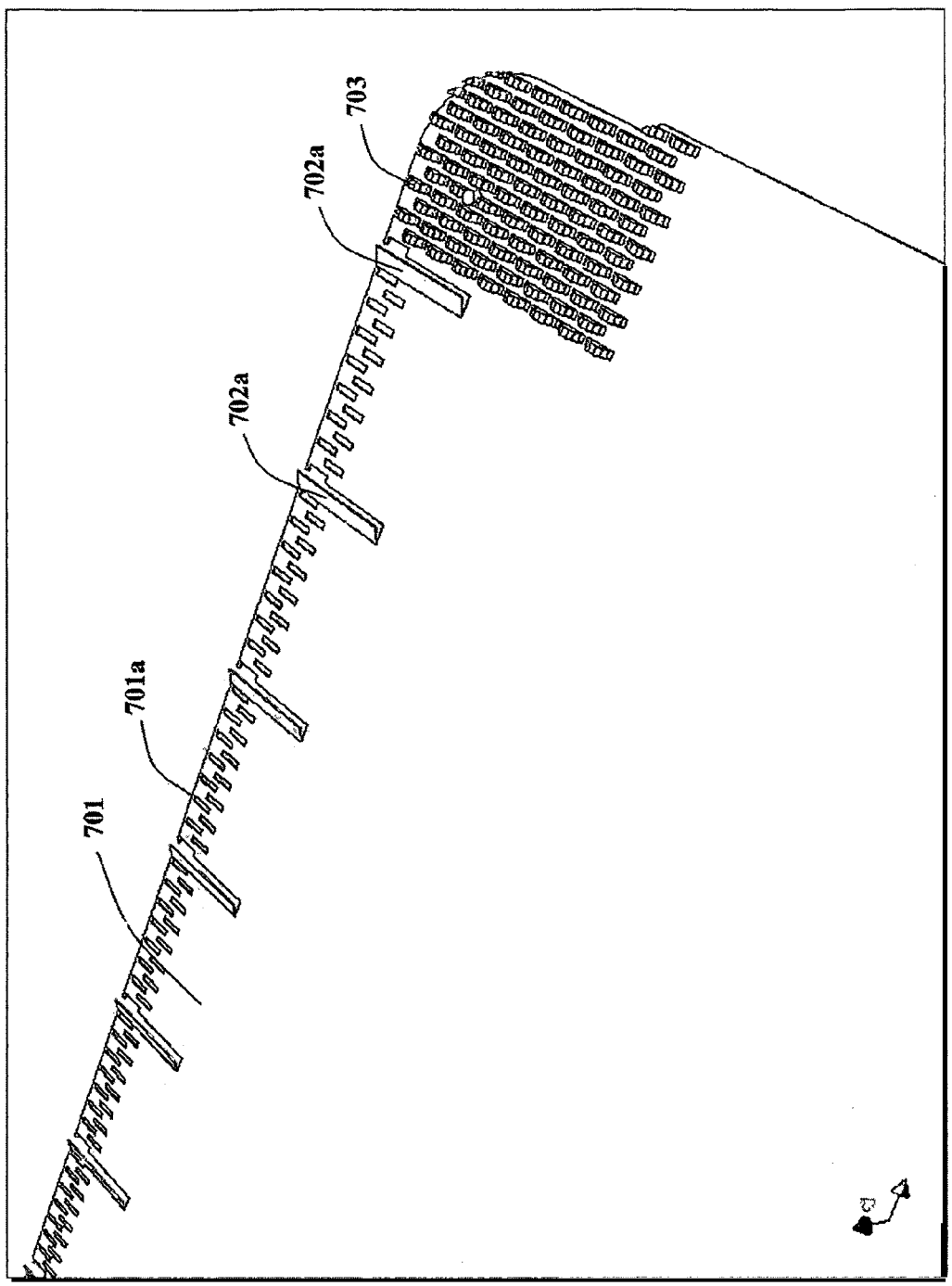
Figure 10:
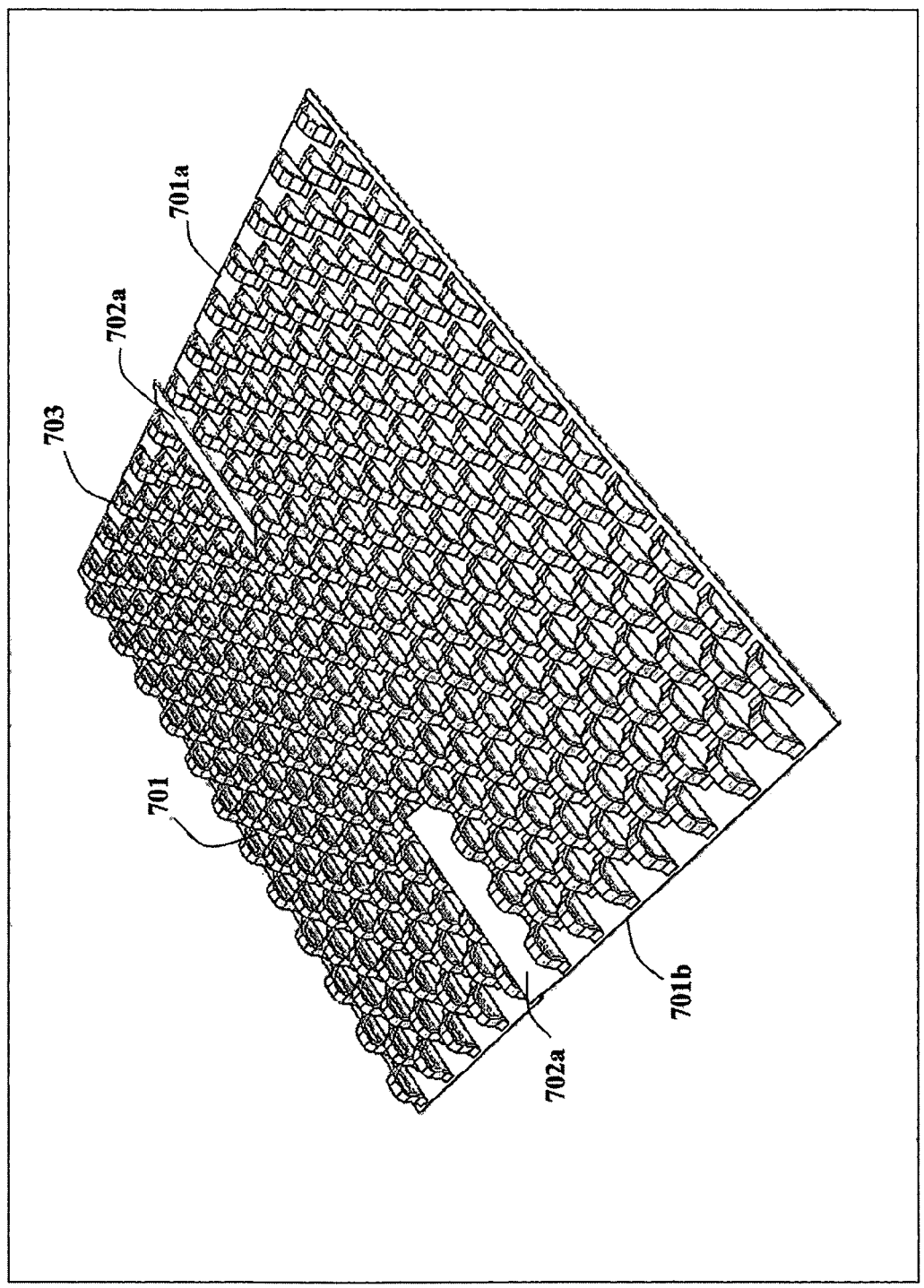

FIGS. 8-10 show a further embodiment of a current collector plate 701 provided with baffle assemblies 702 along the edges 701a and 701b. These edges are situated in the corresponding pocket areas of a bipolar separator plate as above-described for the current collectors 116 and 118. In this case, the baffles 702a of the baffle assemblies are created from the current collector plate itself. In particular, in the case shown, the baffles are fabricated as follows: the corrugations 703 of the current collector in areas along the side edges where the baffles are to be situated are flattened so that the plate becomes flat in these areas; L-shaped die cuts are made in the flattened areas to create flaps or upset segments; the flaps or upset segments or portions are then folded out of the plane of the plate to the height of the corrugations of the plate. The folded up flaps or upset plate portions thus form the desired baffles. Both directing and end baffles can be formed in this manner.

It should be noted that the current collector plates 116, 118 and 701 can be made of a stainless steel plate material, as can the bipolar plate 100A. The pocket members 104, 106, 110, and 112, in turn, also can be made of stainless steel plate material.

In both the baffle assembly 120 and the baffle assembly 122 of FIGS. 1, 2A-2C and 4A, the number and shape of the baffles can be optimized for better performance of the directing assemblies and low manufacturing cost. Performance of the assemblies can be analyzed using computational fluid dynamics to optimize baffle number and applying angle. In particular, the performance of each assembly is directly affected by the gas flow leak rate, which is dependent on the number of baffles. The flow leak rate can be determined using the following equations:

$$\text{Flow leak rate} = \text{Bypass Ratio} - \frac{(\text{Bypass Ratio} * \text{Baffle Number})}{\text{Number of Slots}} \quad (1)$$

$$\text{Bypass Ratio} = \frac{\text{Flow Into Slot}}{\text{Total Inlet Flow}} \quad (2)$$

In equation (1), the Baffle Number is the number of baffles used and number of slots represents the number of spaces between the baffles.

The performance of fuel and oxidant gas directing assemblies with varying number of directing baffles was tested using the arrangements shown in FIGS. 1, 2A and 4A. In these arrangements, the bypass ratio of the fuel gas was approximately <0.5% and the bypass ratio of the oxidant gas was approximately <0.8%.

Figure 11:
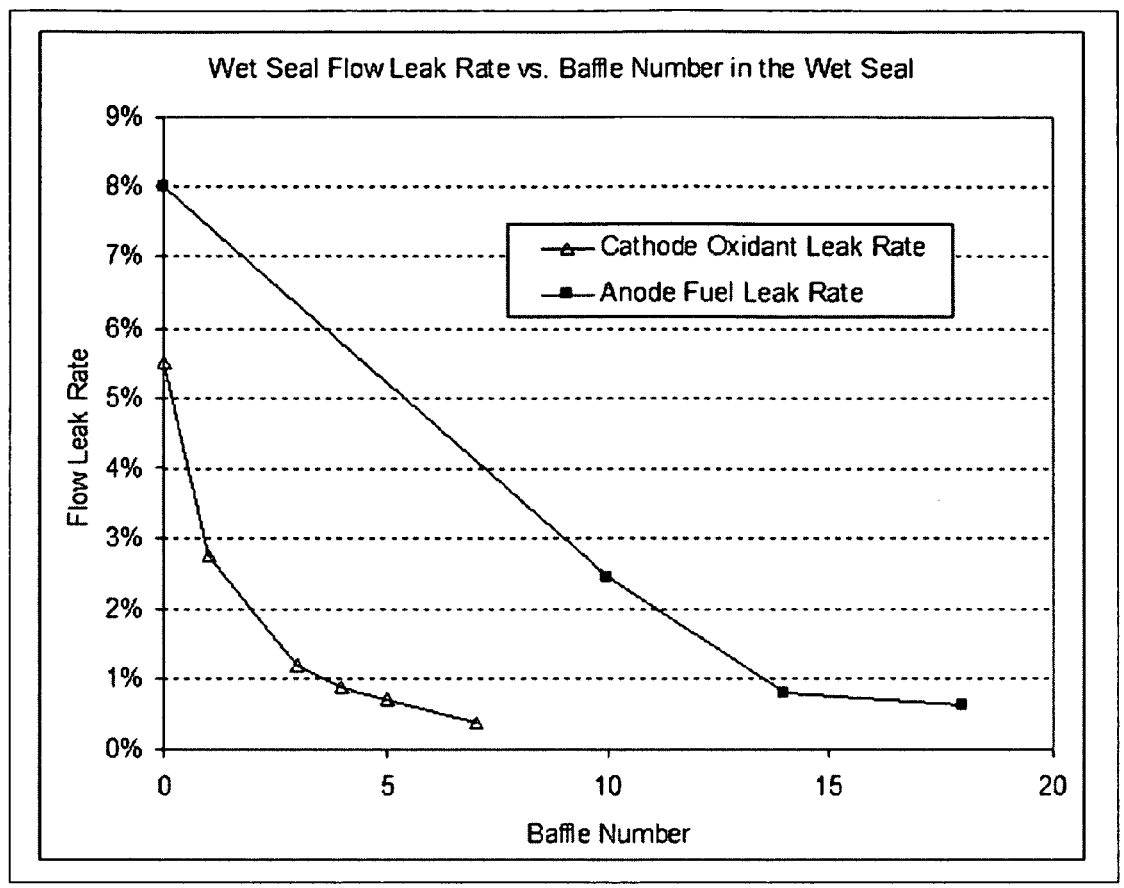
FIG. 11 shows a chart of performance results of the plate structure of FIG. 1.

FIG. 11 shows a performance chart for baffle assemblies of FIGS. 1, 2A and 4A employing different numbers of directing baffles. Particularly, the X-axis in FIG. 11 represents the number of baffles used in each directing assembly, while the Y-axis represents the flow leak rate, or the percentage of gas flowing into the inactive wet seal areas.

As can be seen in FIG. 11, when no anode side directing baffles were used, approximately 8% of the fuel gas flowed into the inactive wet seal areas 104a, 106a, bypassing the anode active area 108. As the number of anode side directing baffles was increased, the flow leak rate of the fuel gas decreased. In particular, when the number of fuel directing baffles was increased to 10, the flow leak rate decreased to about 2.4%, and when the number of directing baffles was increased to 14 or 18, the flow leak rate further decreased to below 1%.

Similarly, if no cathode side directing baffles were used, approximately 5.5% of the oxidant gas bypassed the cathode active area 114 by flowing into the inactive wet seal areas 110a, 112a. When one oxidant gas directing baffle was used in each directing assembly 122, the flow leak rate of the oxidant gas decreased to 2.7%. When the number of oxidant gas directing baffles was increased to 3, the flow leak rate of the oxidant gas decreased to slightly over 1%, and when 4, 5 or 7 directing baffles were used in each oxidant baffle assembly, the oxidant flow leak rate further decreased to below 1%.

As can be seen from FIG. 11, the optimal number of fuel directing baffles is between 14 and 18 and the optimal number of oxidant gas directing baffles is between 3 and 7. It is understood that the optimal number of directing baffles will vary in assemblies of different dimensions than the illustrative examples described above. Moreover, the optimal number of directing baffles will be different if the bypass ratio of the gas increases or decreases.

In all cases it is understood that the above-described arrangements are merely illustrative of the many possible specific embodiments which represent applications of the present invention. Numerous and varied other arrangements can be readily devised in accordance with the principles of the present invention without departing from the spirit and the scope of the invention.

What is claimed is:

1. An assembly having fuel cell plate structure for use in a fuel cell and comprising:
   a plate member including a plurality of corrugations forming gas flow channels for carrying process gas, said plate member having a central area adjacent active areas of a fuel cell and opposing first and second side edges bordering said central area, said first and second side edges being adjacent inactive wet seal areas of a fuel cell,
   the plate member having a plurality of baffles situated in the path of the corrugations and spaced along said opposing first and second side edges of said plate member and extending at least in a direction transverse to flow direction of said process gas flowing through said corrugations, such that when the plate structure is in a fuel cell, the plurality of baffles of the plate structure cause the process gas flowing through said corrugations and adjacent said opposing first and second side edges of said plate member to be directed away from said opposing first and second side edges and toward said central area of said plate member.

2. An assembly in accordance with claim 1, wherein:
   each of said one or more baffles comprises one of: a material applied to said plate member; and an upset segment of said plate member.

3. An assembly in accordance with claim 2, wherein said material includes one or more of: a zirconia-based material derived from a paste comprising alumina cement, zirconium oxide, zirconia felt and water; a metallic material derived from a mixture of a nickel metallic powder and a binder; a zirconia felt material; and a ceramic material.

4. An assembly in accordance with claim 3, wherein said plate member comprises at least one of an anode current collector and a cathode current collector; and
   said one or more baffles are incorporated in at least one of said anode current collector and said cathode current collector.

5. An assembly in accordance with claim 4, wherein:
   each of said one or more baffles comprises one of: a continuous rectangular-shaped material arranged along a side of one of said anode current collector and said cathode current collector; a continuous saw-tooth shaped material arranged along a side of one of said anode current collector and said cathode current collector; a plurality of discrete spaced pieces of baffle material arranged along a side of one of said anode current collector and said cathode current collector; and a plurality of spaced upset edge segments of said one of said anode current collector and said cathode current collector.

6. An assembly in accordance with claim 5, further comprising:
   other components forming with said plate structure said fuel cell.

7. An assembly in accordance with claim 1, wherein:
   each of said baffles comprises one of: a continuous rectangular-shaped baffle material; a continuous saw-tooth shaped baffle material; a plurality of discrete spaced pieces of baffle material; a plurality of spaced upset edge segments of said plate member.

8. An assembly in accordance with claim 1, wherein:
   said baffle material comprises one or more of: a zirconia-based material derived from a paste comprising alumina cement, zirconium oxide, zirconia felt and water; a metallic material derived from a mixture of a nickel metallic powder and a binder; a zirconia felt material; and a ceramic material.

9. An assembly in accordance with claim 1, wherein:
   said plurality baffles comprise a first plurality of baffles situated along said first side edge of said plate member and a second plurality of baffles situated along said second side edge of said plate member.

10. An assembly in accordance with claim 9, wherein;
said plate member includes input and output edges transverse to said first and second side edges and bordering said central area;
said plate member is an anode current collector;
said first plurality of baffles include a first corner baffle at the corner of said first side edge and said output edge and one or more baffles along said first side edge spaced from said first corner baffle; and
said second plurality of baffles include a second corner baffle at the corner of said second side edge and said output edge and one or more baffles spaced from said second corner baffle.

11. An assembly in accordance with claim 10, wherein:
said first plurality of baffles includes a third corner baffle at the corner of said first side edge and said input edge; and
said second plurality of baffles includes a fourth corner baffle at the corner of said second side edge and said input edge.

12. An assembly in accordance with claim 11, wherein:
said one or more baffles of said first plurality of baffles spaced from said first corner baffle are slanted at a predetermined angle in the direction of said output edge to said first side edge;
said one or more baffles of said second plurality of baffles spaced from said second corner baffle are slanted at a predetermined angle in the direction of said output edge to said second side edge.

13. An assembly in accordance with claim 12, wherein:
said angle is 45°; and
each of said first and second plurality of baffles contains from 14 to 18.

14. An assembly in accordance with claim 12, wherein:
each of said baffles of said first and second plurality of baffles comprises one of: a material applied to said plate member; and an upset segment of said plate member;
said material includes one of: a zirconia-based material derived from a paste comprising alumina cement, zirconium oxide, zirconia felt and water; and a metallic material derived from a mixture of a nickel metallic powder and a binder.

15. An assembly in accordance with claim 9, wherein;
said plate member includes input and output edges transverse to said first and second side edges and bordering said central area;
said plate member is a cathode current collector;
said first plurality of baffles include: a first corner baffle at the corner of said first side edge and said output edge; one or more baffles along said first side edge spaced from said first corner baffle; and a second corner baffle at the corner of said first side edge and said input edge; and
said second plurality of baffles include: a third corner baffle at the corner of said second side edge and said output edge; one or more baffles spaced from said third corner baffle; and a fourth corner baffle at the corner of said second side edge and said input edge.

16. An assembly in accordance with claim 15, wherein:
said one or more baffles of said first plurality of baffles spaced from said first corner baffle are perpendicular to said first side edge;
said one or more baffles of said second plurality of baffles spaced from said third corner baffle are perpendicular to said second side edge.

17. An assembly in accordance with claim 16, wherein:
each of said first and second plurality of baffles contains from 4 to 7 baffles.

18. An assembly in accordance with claim 16, wherein:
each of said baffles of said first and second plurality of baffles comprises one of: a material applied to said plate member; and an upset segment of said plate member.

19. An assembly in accordance with claim 18, wherein:
said material includes one of: a zirconia-based material derived from a paste comprising alumina cement, zirconium oxide, zirconia felt and water; and a metallic material derived from a mixture of a nickel metallic powder and a binder.

20. An assembly in accordance with claim 1, wherein:
said plate structure is adapted to be used in adjacent first and second fuel cells and further includes: a bipolar plate having opposing anode and cathode surfaces bordered by first and second opposing edges of the bipolar plate and third and fourth opposing edges transverse to said first and second opposing edges of the bipolar plate; first and second pocket areas situated on said anode surface of said bipolar plate at said first and second opposing edges of said bipolar plate, respectively; and third and fourth pocket areas situated on said cathode surface of said bipolar plate at said third and fourth opposing edges of said bipolar plate, respectively;
said first and second pocket areas and said third and fourth pocket areas of said bipolar plate being inactive wet seal areas of said first and second fuel cells, respectively, when said plate structure is used in said first and second fuel cells;
said anode surface of said bipolar plate between said first and second pocket areas of said bipolar plate and said cathode surface of said bipolar plate between said third and fourth pocket areas of said bipolar being active areas of a said first and second fuel cells, respectively, when said plate structure is used in said first and second fuel cells; and
said plate member abutting one of said anode surface and said cathode surface of said bipolar plate such that said central area of said plate member is adjacent said active area and said opposing first and second side edges of said plate members are disposed in one of: said first and second pocket areas and said third and fourth pocket areas, and said plurality of baffles are situated in said one of said first and second pocket areas, and third and fourth pocket areas.

21. An assembly in accordance with claim 20, said plate structure comprising a further plate member abutting the other one of said anode surface and said cathode surface of said bipolar plate and including a plurality of baffles, wherein:
said baffles are situated in each of said first, second third and fourth pocket areas.

22. An assembly in accordance with claim 20, wherein:
each of said baffles comprises one of: a material applied to said plate member; and an upset segment of said plate member.

23. An assembly in accordance with claim 22, wherein said material includes one of: a zirconia-based material derived from a paste comprising alumina cement, zirconium oxide, zirconia felt and water; a metallic material derived from a mixture of a nickel metallic powder and a binder; a zirconia felt material; and a ceramic material.

24. An assembly in accordance with claim 20, wherein said plate member is one of an anode current collector adjacent said anode surface of said bipolar plate and a cathode current collector adjacent said cathode surface of said bipolar plate; and said baffles are incorporated in said one of said anode current collector and said cathode current collector.

25. An assembly in accordance with claim 24, wherein:
each of said one or more baffles comprises one of: a continuous rectangular-shaped material arranged along a side of one of said anode current collector and said cathode current collector; a continuous saw-tooth shaped material arranged along a side of one of said anode current collector and said cathode current collector; a plurality of discrete spaced pieces of baffle material arranged along a side of one of said anode current collector and said cathode current collector; and a plurality of spaced upset edge segments of said one of said anode current collector and said cathode current collector.

26. An assembly in accordance with claim 25, further comprising:
other components forming with said plate structure said first and second fuel cells.

27. An assembly in accordance with claim 24, wherein:
each of said one or more baffles comprises one of: a material applied to said plate member; and an upset segment of said plate member;
said plate member comprises said anode current collector and said plate structure comprise a further plate member comprising said cathode current collector; and
said baffles are incorporated in said anode current collector and said cathode current collector.

28. An assembly in accordance with claim 20, wherein:
said plate member is an anode current collector having a central area and opposing first and second side edges bordering said central area such that when said plate structure is in said fuel cell said central area of said anode current collector lies adjacent the central area of said anode surface of said bipolar plate and said first and second side edges of said anode current collector are adjacent and within said first and second pocket areas on said anode surface of said bipolar plate; and
said baffles are along one or more of said opposing first and second side edges of said anode current collector.

29. An assembly in accordance with claim 28, wherein:
said baffles comprise a first plurality of baffles situated along said first side edge of said anode current collector and a second plurality of baffles situated along said second side edge of said anode current collector.

30. An assembly in accordance with claim 29, wherein:
said anode current collector includes input and output edges transverse to said first and second side edges and bordering said central area of said anode current collector;
said first plurality of baffles include a first corner baffle at the corner of said first side edge and said output edge of said anode current collector and one or more baffles along said first side edge spaced from said first corner baffle of said anode current collector; and
said second plurality of baffles include a second corner baffle at the corner of said second side edge and said output edge of said anode current collector and one or more baffles spaced from said second corner baffle of said anode current collector.

31. An assembly in accordance with claim 30, wherein:
said first plurality of baffles include a third corner baffle at the corner of said first side edge and said input edge of said anode current collector; and
said second plurality of baffles include a fourth corner baffle at the corner of said second side edge and said input edge of said anode current collector.

32. An assembly in accordance with claim 31, wherein:
said one or more baffles of said first plurality of baffles spaced from said first corner baffle of said anode current collector are slanted at a predetermined angle in the direction of said output edge to said first side edge of said anode current collector;
said one or more baffles of said second plurality of baffles spaced from said second corner baffle of said anode current collector are slanted at a predetermined angle in the direction of said output edge to said second side edge of said anode current collector.

33. An assembly in accordance with claim 32, wherein:
said angle is 45°; and
each of said first and second plurality of baffles contains from 14 to 18 baffles.

34. An assembly in accordance with claim 32, wherein:
each of said baffles of said first and second plurality of baffles comprises one of: a material applied to said plate member; and an upset segment of said plate member.

35. An assembly in accordance with claim 34, wherein:
said material includes one of: a zirconia-based material derived from a paste comprising alumina cement, zirconium oxide, zirconia felt and water; and a metallic material derived from a mixture of a nickel metallic powder and a binder.

36. An assembly in accordance with claim 32, wherein:
said plate structure further includes a cathode current collector comprising a further plate member having a central area and opposing first and second side edges bordering said central area such that when said plate structure is in said fuel cell said central area of said cathode current collector lies adjacent the central area of said cathode surface of said bipolar plate and said first and second side edges of said cathode current collector are adjacent and within said third and fourth pocket areas on said cathode surface of said bipolar plate; and
said one or more baffles are along one or more of said opposing first and second side edges of said cathode current collector.

37. An assembly in accordance with claim 36, wherein:
said cathode current collector includes input and output edges transverse to said first and second side edges and bordering said central area of said cathode current collector;
said one or baffles includes a third plurality of baffles situated along said first side edge of said cathode current collector and a fourth plurality of baffles situated along the second side edge of said cathode current collector.

38. An assembly in accordance with claim 37, wherein:
said cathode current collector includes input and output edges transverse to said first and second side edges and bordering said central area of said cathode current collector;
said third plurality of baffles include: a first corner baffle at the corner of said first side edge and said output edge of said cathode current collector; one or more baffles along said first side edge of said cathode current collector spaced from said first corner baffle of said third plurality of baffles; and a second corner baffle at the corner of said first side edge and said input edge of said cathode current collector; and
said fourth plurality of baffles include: a third corner baffle at the corner of said second side edge and said output edge of said cathode current collector; one or more baffles along said second edge of cathode current collector spaced from said third corner baffle of said fourth plurality of baffles; and a fourth corner baffle at the corner of said second side edge and said input edge of said cathode current collector.

39. An assembly in accordance with claim 38, wherein:

said one or more baffles of said third plurality of baffles spaced from said first corner baffle are perpendicular to said first side edge of said cathode current collector;

said one or more baffles of said fourth plurality of baffles spaced from said third corner baffle are perpendicular to said second side edge of said cathode current.

40. An assembly in accordance with claim 39, wherein:

each of said third and fourth plurality of baffles contains from 4 to 7 baffles.

41. An assembly in accordance with claim 37, wherein:

each of said baffles of said first, second, third and fourth plurality of baffles comprises one of: a material applied to said plate member; and an upset segment of said plate member.

42. An assembly in accordance with claim 41, wherein:

said material includes one of: a zirconia-based material derived from a paste comprising alumina cement, zirconium oxide, zirconia felt and water; and a metallic material derived from a mixture of a nickel metallic powder and a binder; and said cathode current collector includes corrugations.

* * * * *